July 19, 1927.

W. E. KNOTT 1,636,421

CHUCK

Filed Aug. 10, 1925

Inventor
Warren E. Knott.
By Frank E. Liviance Jr.
Attorney.

Patented July 19, 1927.

1,636,421

UNITED STATES PATENT OFFICE.

WARREN E. KNOTT, OF GRAND RAPIDS, MICHIGAN.

CHUCK.

Application filed August 10, 1925. Serial No. 49,170.

This invention relates to a chuck adapted for use in a variety of places, such for instance as with drill presses, with saws for sawing button blanks from shells, or any other place where a tool is to be driven directly from a rotating spindle and in alignment therewith. It is an object and purpose of the present invention to make a chuck of this character which is instantly operable for the release of the tool or the securing of the same in place, it being understood that such tools in service become dull and have to be replaced by newly sharpened tools, the old one being removed for the purpose of sharpening. A further object and purpose of the invention is to provide a chuck of this character by means of which a very secure connection may be made between the tool and the mechanism driving the same and one in which the tool is automatically held tightly in position at all times and prevented from having any loose motion, particularly any endwise movement, this chuck being so constructed that the collet with which the tool is associated is automatically maintained at all times in very tight engagement with the socket in which it is located.

An understanding of the invention and the construction which I have devised for embodying the same may be had from the following description taken in connection with the accompanying drawing, in which, Fig. 1 is a vertical section showing the chuck in operative position and holding a tool securely therein.

Like reference characters refer to like parts in the different figures of the drawing.

Figure 1:
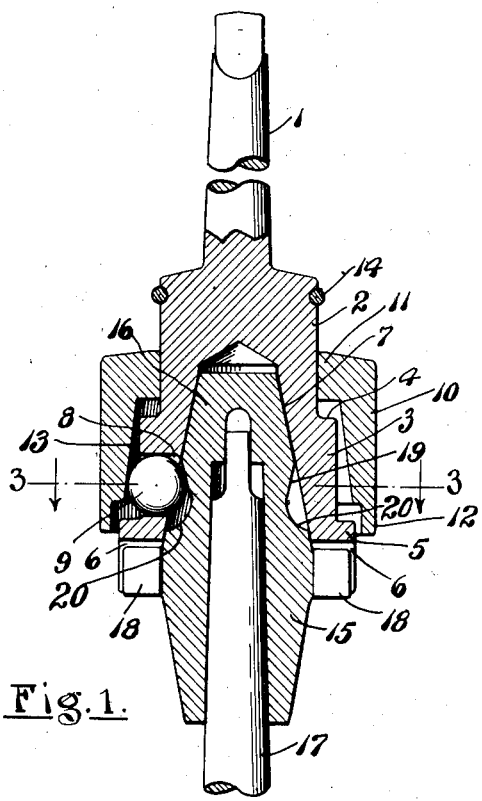

In the construction of the chuck an inner chuck member is provided including a shank 1 adapted to be connected in any suitable manner with the end of a drive spindle, the same being enlarged and increased in diameter at one end as indicated at 2 for a distance, then again enlarged and increased in diameter as indicated at 3, there being a horizontal annular shoulder between the parts 2 and 3. And below the part 3 it is still farther enlarged and increased in diameter as shown at 5. This end portion 5 of the chuck member is formed with diametrically opposed slots 6 in its sides, one at each side of a conical opening bored into the lower end of the member through the parts 5 and 3 and into said part 2. This opening has sides tapering upwardly and inwardly as indicated at 7.

The part 3 of the chuck member described, at a number of equally spaced apart points in its circumference, is formed with openings 8 bored through from the outside to the inner conical opening, these openings being located a short distance above the lower portion 5 of the member. In these openings 8 cylindrical balls 9 are mounted.

Figure 2:
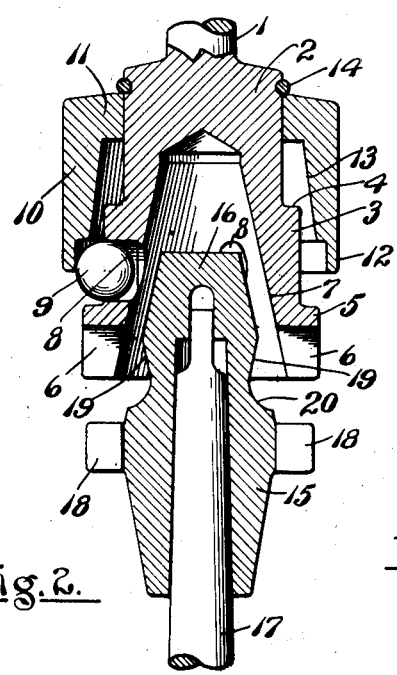
Fig. 2 is a view similar to Fig. 1 but illustrating the parts in separated position.
Figure 3:
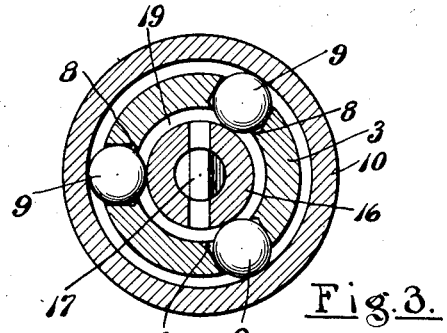
Fig. 3 is a horizontal section on the plane of line 3—3 of Fig. 1.
Figure 4:
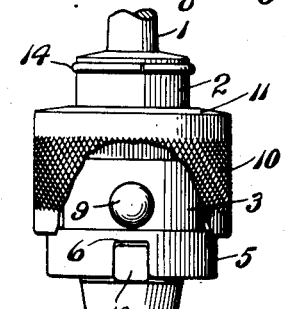
Fig. 4 is a reduced elevation of the tool, a part of the outer collar being broken away to better disclose the structure.

An outer chuck member including a movable collar 10 is located over the inner member, its upper edge being turned inwardly to make a horizontal annular flange 11 there being a circular opening through the upper side of the outer chuck member of a size to freely pass the part 2 of the inner chuck member first described. At its lower edge the collar 10 is reduced in thickness by removing the metal at the inner side thereof, whereby a depending annular lip 12 is made. The inner sides of the collar taper upwardly and inwardly as indicated at 13. This outer chuck member is adapted to be moved up and down on the part 2, being stopped in its lower position by engagement of the annular flange 11 with the shoulder 4 and in its upward movement by engagement with a stop ring 14, which is a split ring of spring material snapped into a groove around the upper end of the part 2, as shown. With the collar 10 in lower position, as shown in Fig. 1, the tapered inner sides 13 bearing against the balls 9 force the same inwardly. When the collar member is in upper position as shown in Fig. 2 the balls may move outwardly until stopped by the annular lip 12. In such outer position the balls 9 at their innermost points are outside of the tapered sides 7 of the opening made in the lower end of the shank member, as fully shown in Fig. 2.

Figure 5:
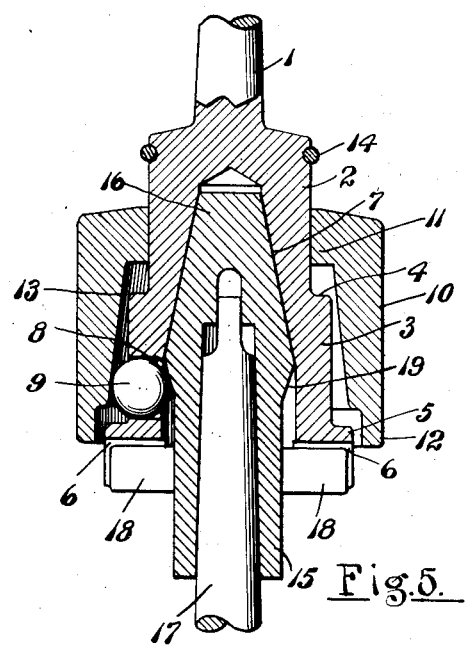
Fig. 5 is a view similar to Fig. 1 showing a slight modification in the construction of the collet.

In the tapered opening made in the lower end of the inner chuck member a collet 15 is adapted to be placed, the upper end 16 of which is tapered to correspond to the walls 7 of the opening in the said member. Collets of this kind are used with various chucks for the purpose of adapting different sized drills with the different shanks thereof to the chuck in question. In the present instance a drill shank 17 is shown inserted in the lower end of the collet but it is apparent that any other tool may be used and applied to a collet adapted to fit the chuck, the drill 17 being used for purposes of illustration only. The collet 15 is provided with oppositely extending lugs 18 shaped to fit the slots 6 heretofore described, when the collet is in upper position. An annular groove is made around the upper portion 16 of the collet, said groove having an inwardly tapered annular side 19 at its upper portion which joins with a curved annular lower portion 20, as shown in Figs. 1 and 2; while in Fig. 5 the collet is formed with the inwardly inclined annular surface 19 only, the sides of the collet extending straight downward from the inner end of the inclined side 19. In either case when the balls are forced inwardly by the movement of the collar member 10 to lower position, as shown in Figs. 1 and 5, said balls engage against the inclines at 19 and have a tendency to move the tapered upper portion 16 of the collet upwardly into snug engagement with the walls 7 of the opening bored into the lower end of the shank member; and in such upper position the lugs 18 fitting into the slots 6 make a driving connection between the inner chuck member and the collet thereby causing the drill to turn with the inner chuck member which in turn is connected to the driving shaft or spindle.

Disconnection of the collet 15 and the tool connected therewith is readily made by elevating the outer member 10 to an upper position, as shown in Fig. 2, whereupon the balls 9 are permitted outward movement and the same will be forced outwardly on movement of the collet downwardly, the inclined surfaces at 19 causing the balls to move outward until they engage with the lip 12 as shown in Fig. 2.

The connection and disconnection of the collet and tool carried thereby with the chuck is very simple and expeditious, the same taking place almost instantly. The driving connection is provided by the lugs 18 engaging in the slots 6, the balls engaging against the inclined surfaces 19 of the annular groove around the collet serving to hold the collet against downward movement and at all times tending to force the collet upwardly into snug engagement with the socket in which it is mounted. This construction is very practical and efficient and any loosening between the chuck and the collet is insured against. There is no end play of the collet or any other loose motion possible with a construction of this character. The invention is defined in the appended claim and is to be considered as comprehensive of all forms of structure coming within its scope.

I claim:

A chuck comprising, a vertical inner member having an upwardly and inwardly extending axial tapered opening and a plurality of radial openings through the side of said member communicating with the axial opening, a ball located in each radial opening, a collet having a tapered upper portion to fit the tapered opening of said inner chuck member, said collet at the lower end of said tapered upper portion having a downwardly and inwardly extending annular face against which said balls may bear, the points of contact of the balls against said face being in a horizontal plane located above the centers of said balls, a second chuck member comprising, a vertically movable collar around the inner member and having an upwardly and inwardly tapered internal surface to bear against the outer portions of said balls, and co-acting driving means on said collet and inner chuck member.

In testimony whereof I affix my signature.

WARREN E. KNOTT.